(12) United States Patent
Merbach et al.

(10) Patent No.: US 8,414,282 B2
(45) Date of Patent: Apr. 9, 2013

(54) METHOD FOR PRODUCING THERMOFORMED ARTICLES AS WELL AS A DIE FOR THE PRODUCTION THEREOF

(75) Inventors: Juergen Merbach, Stade (DE); Hauke Dieckmann, Ahlerstedt (DE); Michael Kraut, Bremervoerde-Elm (DE)

(73) Assignee: RPC BEBO-Plastik GmbH, Bremervoerde (DE)

( * ) Notice: Subject to any disclaimer, the term of this patent is extended or adjusted under 35 U.S.C. 154(b) by 0 days.

(21) Appl. No.: 12/739,070

(22) PCT Filed: Oct. 23, 2008

(86) PCT No.: PCT/EP2008/064376
§ 371 (c)(1),
(2), (4) Date: Apr. 21, 2010

(87) PCT Pub. No.: WO2009/053436
PCT Pub. Date: Apr. 30, 2009

(65) Prior Publication Data
US 2010/0308492 A1 Dec. 9, 2010

(30) Foreign Application Priority Data
Oct. 23, 2007 (DE) .......................... 10 2007 050 637

(51) Int. Cl.
*B28B 11/12* (2006.01)
(52) U.S. Cl. .......................... 425/291; 425/306; 264/156
(58) Field of Classification Search .................. 425/289, 425/308, 290, 291, 306; 83/660, 946, 861; 220/4.23, 837
See application file for complete search history.

(56) References Cited

U.S. PATENT DOCUMENTS

| 2,884,155 | A |   | 4/1959  | Hanson |
| 3,421,682 | A |   | 1/1969  | Eisenbach |
| 5,693,388 | A | * | 12/1997 | Castner et al. ............... 428/35.7 |

FOREIGN PATENT DOCUMENTS

| DE | 1 586 693    | 6/1970  |
| DE | 36 30 063    | 3/1988  |
| DE | 19942874     | 3/2001  |
| DE | 20116769     | 12/2001 |
| DE | 20116770     | 12/2001 |
| DE | 20116771     | 12/2001 |
| EP | 0 718 077    | 6/1996  |
| EP | 1092344      | 4/2001  |
| JP | 9-136353     | 5/1997  |
| JP | 2006-15445   | 1/2006  |
| WO | WO 2005/090199 | 9/2005 |

OTHER PUBLICATIONS

PCT International Preliminary Report on Patentability for PCT/EP2008/064376; Jun. 29, 2010; 1 page.

(Continued)

*Primary Examiner* — Christina Johnson
*Assistant Examiner* — Galen Hauth
(74) *Attorney, Agent, or Firm* — Hunton & Williams LLP

(57) ABSTRACT

The invention relates to a process for producing thermoformed articles such as food packagings or parts thereof with a mechanical weakening between adjoining functional areas, which, for utilization by a user, can be at least partly separated at the mechanical weakening, in a thermoforming die having an upper die and a lower die, the mechanical weakening being introduced with a three-dimensional extension during the period of time during which the material to be formed is located in the thermoforming die, and a thermoforming die for implementing the process.

9 Claims, 10 Drawing Sheets

OTHER PUBLICATIONS

PCT Written Opinion of the International Searching Authority for PCT/EP2008/064376; 8 pages.
International Search Report for PCT/EP2008/064376; Mar. 29, 2010; 5 pages (German language).
Written Answer of the International Search Authority for PCT/EP2008/064376; 6 pages (German language).

* cited by examiner

METHOD FOR PRODUCING THERMOFORMED ARTICLES AS WELL AS A DIE FOR THE PRODUCTION THEREOF

CROSS-REFERENCE TO RELATED APPLICATIONS

The application is a U.S. National Stage Application of International Application of PCT/EP2008/064376 filed Oct. 23, 2008, which claims the benefit of German Patent Application No. 10 2007 050 637.8 filed Oct. 23, 2007, the disclosures of which are herein incorporated by reference in their entireties.

FIELD OF THE DISCLOSURE

The invention relates to a method for producing thermoformed articles such as food packagings or parts thereof, with a mechanical weakening between mutually adjoining functional areas which articles can be separated at least partly from one another at the mechanical weakening, when used by a user, in a thermoforming die with an upper die and a lower die, which are movable against each other (direction of movement of the die), which method comprises the steps of:

feeding a plastic sheet between the upper die and the lower die, and thermoforming the fed plastic sheet by closing the upper die and the lower die in the direction of movement of the die, the mechanical weakening being introduced during the period of time during which the material to be formed is located in the thermoforming die.

Furthermore the invention relates to a die for producing thermoformed articles such as food packagings or parts thereof, which comprises:

an upper die, a lower die and at least one perforating or stamping element with a perforating or stamping cutting edge, which is disposed in the upper die or the lower die, the upper die and the lower die being movable against each other (direction of movement of the die).

BACKGROUND OF THE DISCLOSURE

Thermoformed articles as well as methods and dies for the production thereof are known from the prior art. These articles may e.g. be food packaging or parts thereof. The packagings may contain several chambers, each being filled with a foodstuff. A mechanical weakening, e.g. in the form of a stamping or perforation, may be provided between the individual chambers, along which the chambers can be separated from each other. Such food packagings serve for subdividing larger containers into subcontainers, which can be successively consumed by a consumer. Furthermore, the chambers may be filled with different products which, after opening, are mixed or at least jointly consumed. Finally, packagings are available, in which the different contents of the compartments are to experience a different heating, which is made possible by a separation of the subcontainers.

The packagings are produced by producing the spatial structure of the articles to be produced with the corresponding number of chambers by means of thermoforming from a plane sheet material with connection areas being respectively located between them and the mechanical weakening is introduced into the respectively plane connection area between two chambers. The packagings are closed with a sealed or welded sheet which is also mechanically weakened. Here, the connection area always extends in a single plane that is in parallel to the plane of the sheet.

In food packagings in which the mechanical weakening has the plane extension described above, it is introduced into the material by means of a perforating or stamping die, while it is located in the thermoforming die. However, if the extension of the mechanical weakening deviates from the plane extension described above and extends in a plane that is inclined or vertical to it or if the extension of the mechanical weakening even extends in three direction in space, this method is not suitable for the production of such articles. Such packagings are produced in accordance with the prior art by thermoforming them first of all without a weakening and the mechanical weakening is subsequently introduced by means of a laser beam or water jet. Irrespective of the fact whether the article to be produced or the positioning of the beam or jet is moved, it is necessary to constantly readjust the focusing the beam or jet. It is only possible in this fashion to achieve equal perforation results in all areas of the weakening which is not plane.

The aforementioned method and a container produced by means of this method as a food packaging are e.g. known from WO 2005/090199 A2. This publication discloses a food packaging in the form of sterilizable containers which are connected with each other in a separable fashion. The containers are formed from a plastic material and have a flange (connection area) between each other, which is mechanically weakened and at which the containers can be separated from each other by means of breaking.

The containers themselves are formed from a plastic sheet which is brought into the desired shape by means of a thermoforming process. The mechanical weakening is introduced into the flange area by means of a laser beam or a water jet after the curing of the containers. Here, it is possible by means of a corresponding positioning of the beam or jet and a corresponding focusing to introduce the weakening which extends in an uneven fashion in the direction of processing into the flange area. Although food packagings with a mechanical weakening of good quality can be produced with this method, the processing with a laser beam or water jet represents an additional process step which is connected with a quite essential expenditure and additional costs.

In view of the described prior art the object of the invention is providing a method and a die for the production of thermoformed articles such as food packagings or parts thereof, by which the articles preferably can be produced in a single processing station, wherein, cost-intensive and expensive processes such as laser beam or water jet cutting do not have to be used and by which stabilized, clampable or locking lid elements can also be produced.

SUMMARY OF THE DISCLOSURE

This object is attained by a method of the type mentioned at the beginning, which is characterized in that the weakening is formed in areas of the article, which are staggered with respect to each other in the direction of movement of the die and extend vertically to it, and/or is formed at least partly in at least one plane extending in the direction of movement of the die at an angle α other than 90° to the direction of movement of the die within the article.

Regarding the device, the object is attained by a die of the type mentioned at the beginning, which is characterized in that the perforating or stamping cutting edge comprises at least two first sections which are staggered in the direction of movement of the die relative to each other and which extend vertically to it and each of the two first sections is suited for forming a section of the mechanical weakening and/or the perforating or stamping cutting edge comprises at least a second section which is suited for forming a section of the mechanical weakening and is formed at an angle α other than 90° to the direction of movement of the die.

The die is described by means of a direction of movement of the die which, as a rule, is vertical and a direction or plane extending vertically to it, in which the sheet that is processed by the die normally comes to rest. Thermoformed lids or lower parts (dishes), in particular those with several compartments, are made from this sheet. This working plane which must be described as the sheet plane is vertically to the direction of movement of the die. There are at least two sections extending in the sheet plane and being mutually staggered in the direction of movement of the die, preferably in parallel.

Due to this, a third dimension is circumscribed, into which the mechanical weakening line caused by the perforating or stamping cutting edge is introduced, which has the corresponding sections on the die side.

At least two sections of a mechanical weakening are introduced into the sheet by means of the at least two first sections of the perforating or stamping cutting edge, these sections being preferably formed in a linear fashion.

The line does not exclusively extend horizontally and not exclusively vertically, but may be inclined with respect to the direction of movement of the die, a preferred area of inclination being oriented at an angle of from 35° to 65° with respect to the direction of movement of the die. This is expressed by the circumscription of the term of an angle which is formed unequal to 90° with respect to the direction of movement of the die so that the at least one second section of the perforating or stamping cutting edge has an angle which deviates from an area vertically to the direction of movement. Said angle is defined between the extension of the first or second section of the perforating or stamping cutting edge and the axis of the direction of the movement of the die. A section of the stamping cutting edge which is in the sheet plane as the working plane has an angle of 90° and a section which is vertically to the sheet plane as the working plane has an angle of 0°.

Using the method according to the invention it is possible for the first time to form thermoformed articles with a weakening that is almost arbitrarily formed without the use of additional processes such as laser beam or water jet cutting during the thermoforming. Devices necessary for producing the respective articles are advantageously restricted to those for thermoforming, for which reason production cost can be reduced and manufacturing sequences can be simplified. Customary thermoforming machines or aggregates can be used for implementing the process, a die according to the invention being installed and no cost-intensive extensions such as e.g. an additional laser station being required.

Packagings can be produced in an especially simple and inexpensive manner by means of the process according to the invention, which e.g. comply with high demands on stability. It is possible here to provide stiffenings in the form of stampings, elevations or bends in the connection area of the packaging without its separability being detrimentally influenced by this.

Furthermore, the closing of separable packagings is no longer restricted to the use of sheets that are glued on or welded on. For this purpose, locking or clampable lid elements being especially adapted to the shape and the stability of the cup elements of the packaging may rather be produced using the method according to the invention and/or the dies according to the invention, which are also stabilized by means of a corresponding three-dimensional shaping.

A partial detaching of the material along an arbitrarily shaped line is to be understood by a perforation in the sense of the present invention, any number of connecting webs of to any shape remaining. An area-wise reduction of the cross-section of material is to be understood by a stamping in the sense of the present invention without a complete detachment of the material taking place.

According to the method of the claimed invention the thermoformed articles may either be perforated or stamped. However, it is also possible that both a perforation and a stamping are introduced into the material of the articles which results in that the material is in places completely separated and the remaining webs have a smaller cross-section of material than the remaining area of the material due to the stamping. For reasons of a simple formulation and the better understanding the term of the "mechanical weakening" is used in the subsequent description of the invention, which is to be understood in accordance with the aforementioned explanations and is to cover all these variants.

Any forms of the mechanical weakening can be basically produced. It serves in general for forming a parting line between several functional areas, along which the functional areas can at least partly be separated from each other if the article is utilized by a user. The functional areas may e.g. be containers of a container package, which can be completely separated from each other along the mechanical weakening so that the contents of the individual containers can be used separately in each case. The mechanical weakening can be introduced both into a container and into an appurtenant lid.

As is generally known, its function is furthermore not restricted to separating subcontainers from an entire container, optional functional units can rather be separated from each other by means of the weakening. Thus, it is possible to form prefabricated opening areas in a lid e.g. in the form of openings for a drinking straw or reclosable pouring openings. In the case of a perforation such an opening can be formed in a medium-tight fashion by using an additional sealing sheet. The use of an additional sealing sheet is not required in the case of a stamping.

The weakening is introduced into the articles by using one or several perforating or stamping elements shaped in accordance with the shape of the weakening to be produced. It and/or they form(s) the perforating or stamping cutting edges e.g. in accordance with the blade of a knife which introduces the desired weakening into the material of the article to be produced (in the following referred to as perforating elements and/or perforating cutting edges).

In order to form the desired shape of the perforating cutting edge, one or several perforating elements may be used. In the case of a perforating element its perforating surface copies the shape of the thermoformed article along the course of the mechanical weakening. In the case of several perforating elements each perforating element forms a section of the perforation. The introduction of the perforation is brought about by feeding the perforating element relative to the material located in the die. In the case of several perforating elements this feeding can take place at the same time or in a staggered relationship in terms of time and from one direction or from several directions.

The introduction of the weakening takes place during the period of time, during which the material to be reshaped is located in the thermoforming die. According to a special embodiment of the invention the weakening is formed prior to the "actual reshaping" of the plastic sheet. The advantage of this is that a die with a biased perforating element can be used, which, upon a closing of the thermoforming die, leads the upper die or the lower die. Thus, no separate control is required for the perforating element. The dimension of the stamping can be determined by the magnitude of the lead or the bias of the perforating element and the time of action. The bias of the perforating element can be achieved by means of known systems such as e.g. springs, elastomer elements, hydraulics or pneumatics. Furthermore, a separate drive may be provided for a perforating element. The drive can be implemented by means of known processes in a pneumatic, cam control, hydraulic or motor-driven fashion. It is anyway also possible to implement the perforation after the actual shaping of the plastic material, but still in the thermoforming die.

It may be sensible in the case of especially difficult geometries of the thermoformed article to be produced, to at first only form one part of the weakening and, subsequently, further partial areas of the weakening. A first part of the weakening can e.g. be first formed in a first plane and further parts of the weakening can be subesequently formed in planes which are formed obliquely or in parallel to the first plane. Thus, very complex geometries of thermoformed articles can be produced which are only restricted by the stipulations of tooling.

In the die according to the invention the perforating element cooperates with a counter support. This counter support may be designed as a part of the upper die part and/or the lower die part or it may be separately provided. It is adapted to the geometry of the article to be produced and that of the perforating element. It may be necessary in the case of complex geometries of the perforation element and of the counter support, to have to compensate for deviations due to manufacturing inaccuracies, thermal, elastic or plastic elongations, inaccuracies of the machine or inhomogeneities of the material. Consequently, it is suggested in accordance with a further embodiment of the invention that the perforating element and/or the counter support comprise(s) a compensating structure, which allows for compensating elastic deformations of these elements. The compensating structure may e.g. be realized by elastomer elements, spring elements and machining allowance/undersize or gaps vertically to the direction of compensation. They may be provided in the perforation element, in the counter support or in both.

Furthermore, it is suggested with the invention that the die comprises structures for receiving the material displaced by the perforation or stamping so that the material displaced by the perforation or stamping flows into these structures during or after the perforation process. In an especially advantageous fashion the structures are preferably shaped in the form of recesses such as receiving grooves on both sides along the mechanical weakening. Due to this, the material volume displaced by the perforation can flow into the receiving structures on both sides in accordance with its natural flow behavior and does not result in thickened areas of material laterally next to the mechanical weakening. Such thickened areas of material could detrimentally influence the subsequent thermoforming process, since they would have to be eliminated during the thermoforming process. If this fails, the quality of the produced articles is inferior, since the blank holder cannot form the sealing surface all over. Furthermore, a jamming of the die halves would result, which would result in a corresponding additional load of both the die and the entire machine. During the elimination of the material thickening built up due to the perforation process an increased die wear would result, due to which its service life would be reduced in a detrimental manner. A sheet could only be sealed onto the uneven surface with a limited suitability.

In accordance with a further proposal the perforating or stamping elements can be positioned independently of one another in the case of several perforating or stamping elements. A positionability of the perforating or stamping elements is in particular provided in different space directions to each other. Due to this, the possibility of providing mechanical weakenings, e.g. in undercut areas, is created. Due to an independent drivability of the perforating or stamping elements the process according to the invention can be used for producing the most different thermoformed articles.

The mechanical weakening can be introduced by means of a shear cut or butt cut (knife cut) in the article. It is possible due to the use of a shear cut to in particular provide marginal areas of the article with a shear cut, which facilitates a manual separation of the functional areas of the article by the user.

BRIEF DESCRIPTION OF THE DRAWINGS

Further features and advantages of the invention can be seen by means of the Figs. from the following description of especially preferred embodiments.

DETAILED DESCRIPTION OF EXEMPLARY EMBODIMENTS

Figure 9:
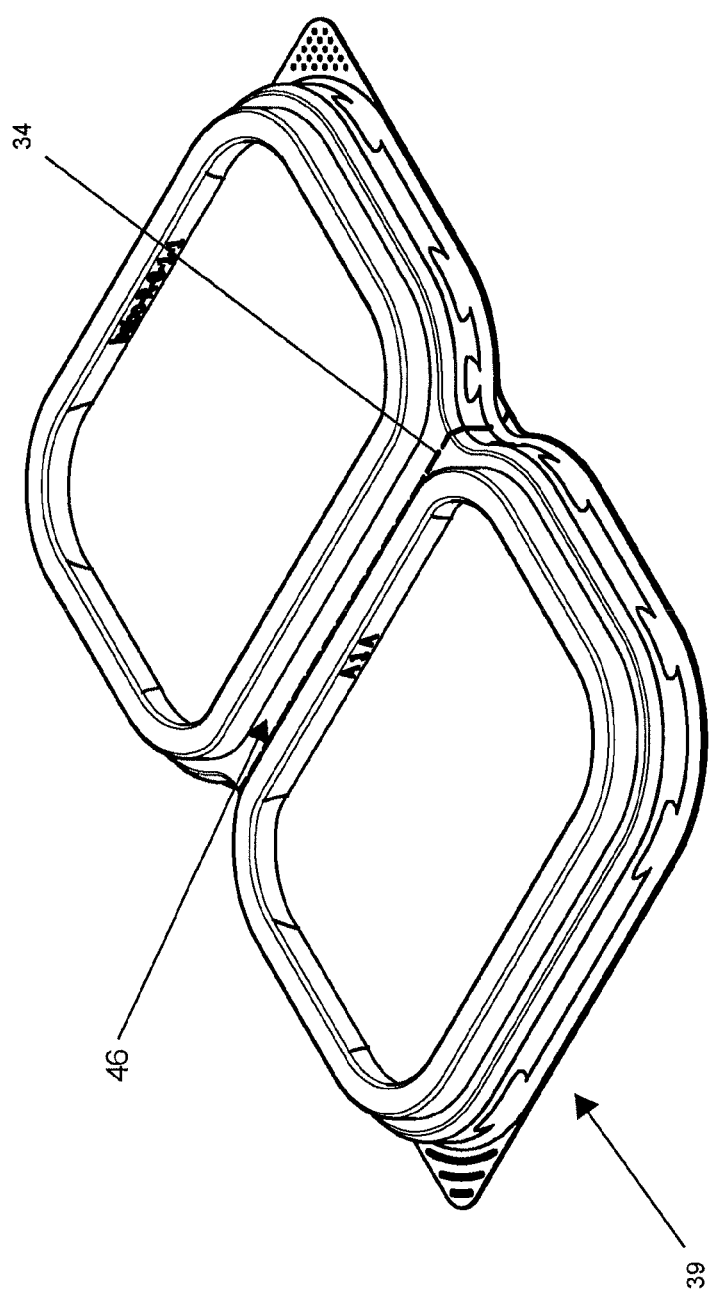
FIG. 9: shows a schematic perspective view of a lid element produced with the die of FIGS. 2 and 3.
Figure 10:
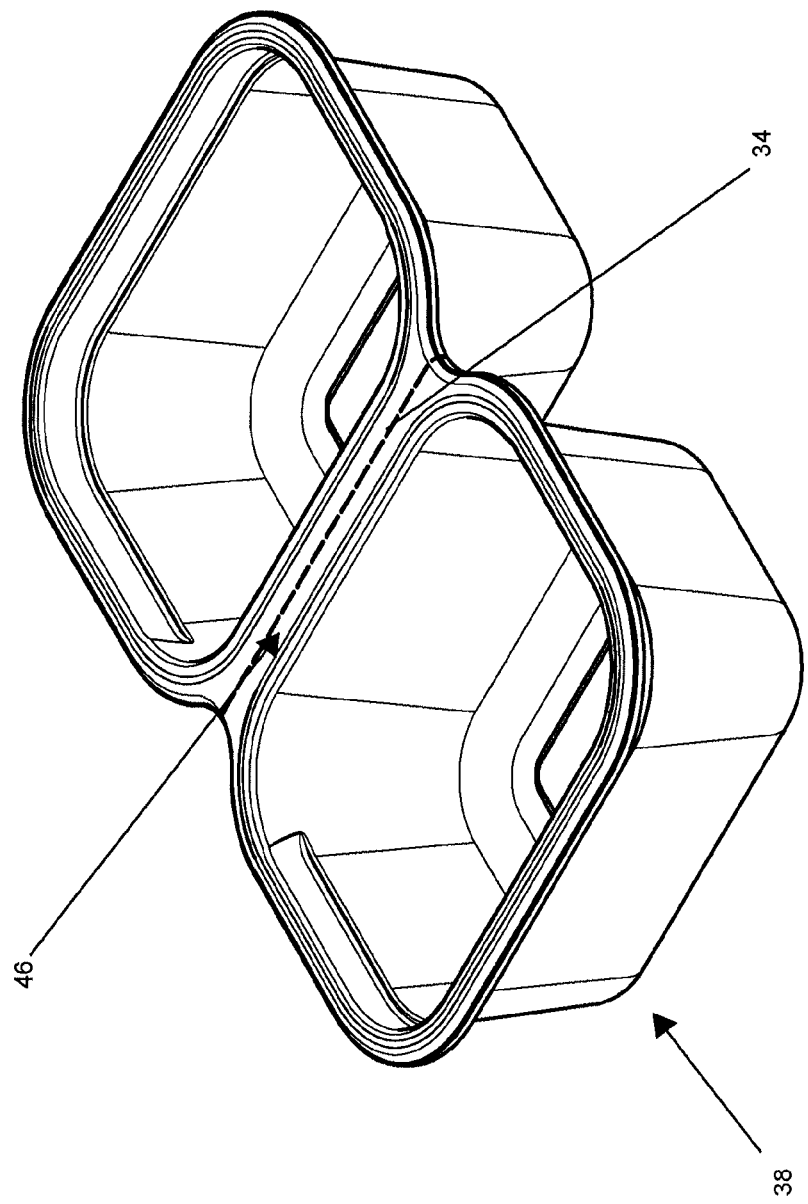
FIG. 10: shows a schematic perspective view of a cup element produced with the die of FIGS. 1 and 8.

Two embodiments of the die according to the invention for producing thermoformed articles are represented by way of example in FIGS. 1, 2, 3 and 8. Using the process according to the invention the components shown in FIGS. 9 and 10—cup element 38 and lid element 39—of a food packaging can be produced with these dies from a plastic sheet introduced into the die. The shown dies have in each case a lower die with a carrier 1 of the lower die and an upper die with a carrier 2 of the upper die.

Figure 1:
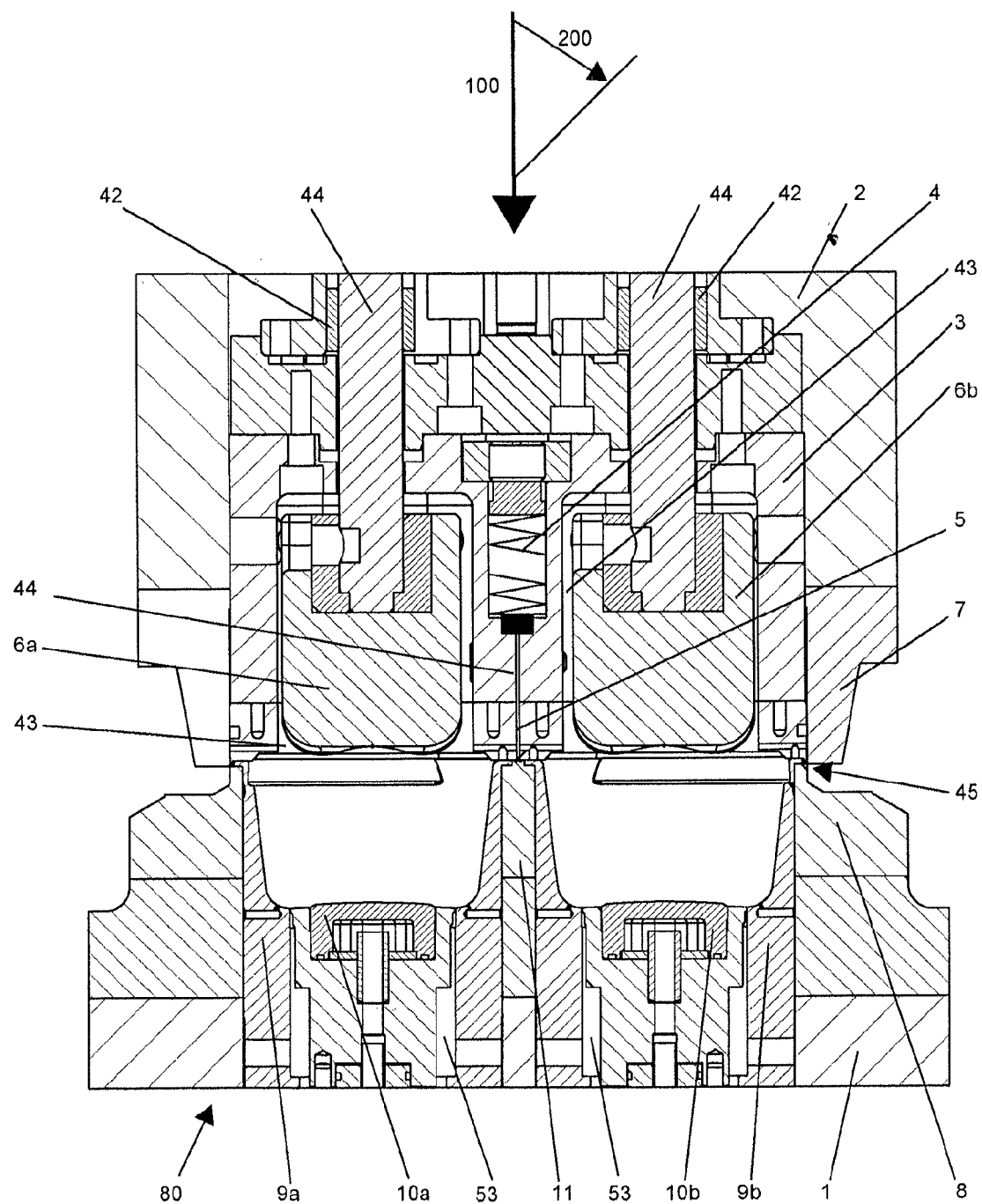
FIG. 1: shows a sectional representation of a thermoforming die with an integrated perforating device for a cup element.
Figure 8:
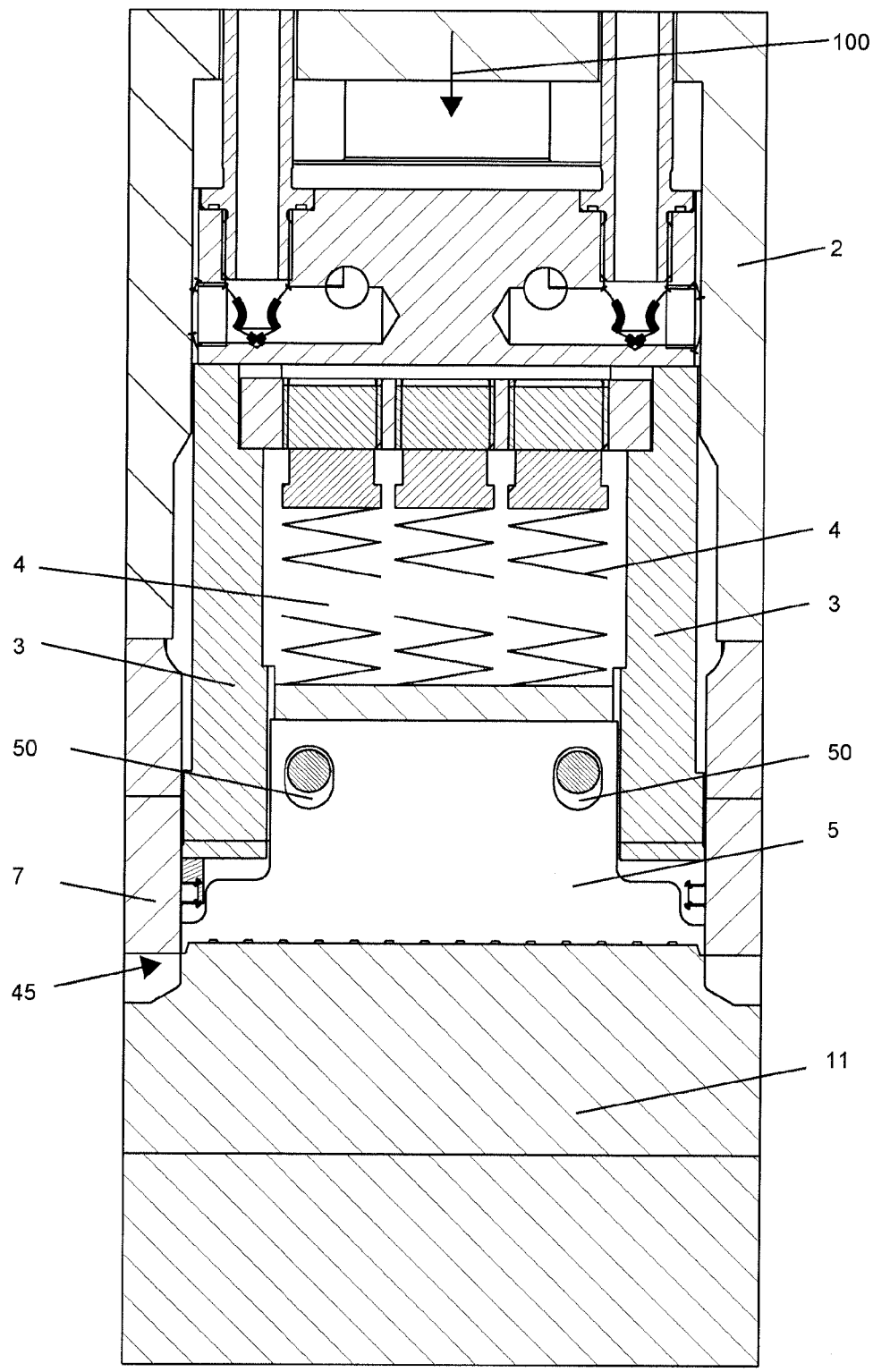
FIG. 8: shows a sectional representation of the thermoforming die of FIG. 1.

The thermoforming die shown in FIGS. 1 and 8 for producing thermoformed cup elements 38 comprises a blank holder 3 disposed in the carrier 2 of the upper die. Two cogging punches 6 *a,b* are guided in the carrier 2 of the upper die and in the blank holder 3 by means of rams 41 *a,b* with the intermediate positioning of corresponding linear guides 42. The cogging punches 6 *a,b* are disposed in correspondingly shaped recesses 43 of the blank holder 3.

A perforating element 5 is disposed in a linearly displaceable fashion in the direction of the lower die in a recess 44 of the blank holder 3, which, here, is linearly disposed. It is biased in the recess 44 with respect to the blank holder 3 by means of a spring 4 or a spring assembly 4.

The unit of blank holder 3, cogging punch 6 *a,b* and perforating element 5 is received in the carrier 2 of the upper die in a linearly displaceable fashion with respect to the carrier 2 of the upper die in the direction of the lower die. A cutting die 7 is disposed on the side of the carrier 2 of the upper die, which points to the lower die, by means of fastening agents (not shown). It cooperates with a blanking punch 8 disposed on the carrier 1 of the lower die and serves for punching the outer edge of the cup element 38 produced by means of the represented die from the plastic sheet.

Molding sleeves 9 *a,b* are disposed in two recesses provided in the blanking punch 8 of the lower die. A counter support 11 is disposed in the area opposite to the perforating element 5 between the molding sleeves 9 *a,b* and the blanking punch 8, which cooperates with the perforating element 5 in a fashion described below. The molding sleeves 9 *a,b* have in each case a recess 53 in which a ejector 10 *a,b* is disposed, which forms at the same time the mold bottom. The ejectors 10 *a,b* are linearly displaceable in the direction of the upper die with respect to the molding sleeves 9 *a*,b, the blanking punch 8 and the carrier 1 of the lower die.

The structure formed of parts of the inner contour of the molding sleeve 9 *a,b* and the surface of the ejector 10 *a*,b, which points in the direction of the upper die, forms a mold according to which the outer side of the cup element to be produced is contoured.

The operation of the thermoforming die shown in FIG. 1 will be explained in the following.

Lower die and upper die are open at the beginning of the working cycle. The material for the cups to be produced is introduced as a plastic sheet into the gap 45 formed between the lower die and the upper die, the die being further opened with respect to the represented position. The material was already heated to a suitable processing temperature in a heating station connected in series with the thermoforming die. After the positioning of the material the upper die advances in the direction of the lower die. The feed of the entire upper die stops, only a further feed of blank holder 3, cogging punch 6 *a,b* and perforating element 5 takes place. Due to the bias achieved by means of the spring assembly 4 the perforating element 5 leads the blank holder 3 and the cutting die 7. The perforating element 5 is the first to contact the plastic sheet present in the gap 45. It introduces a perforation and/or stamping into the plastic sheet in accordance with its structure and its spring bias.

Figure 7:
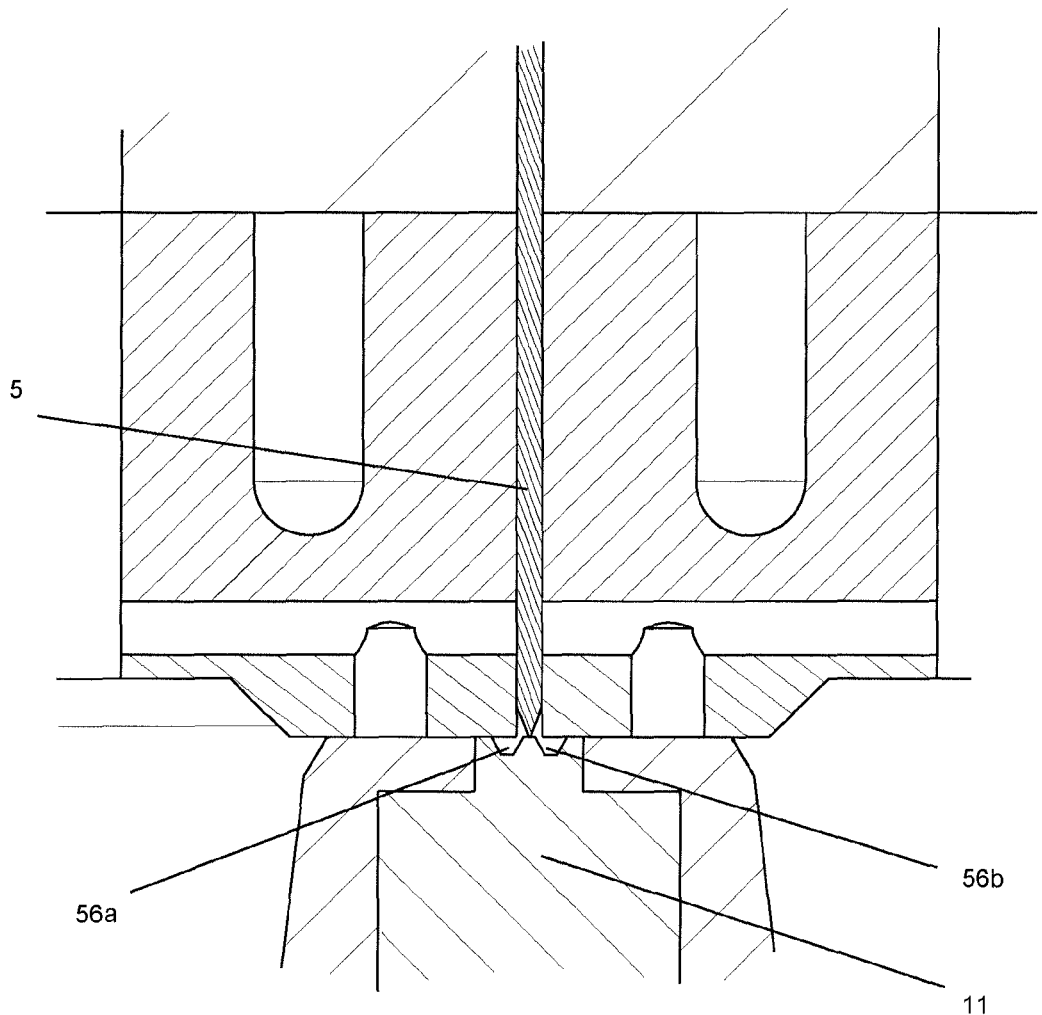
FIG. 7: shows an enlarged view of the perforating element and its counter support of the die of FIGS. 1 and 8.

Shortly after the placing of the perforating agent 5 and its at least partial penetration into the plastic sheet the blank holder 3 is placed onto the sheet present in the gap 45 and fixes it relative to the thermoforming die. The surfaces of the blank holder 3, which point in the direction of the lower die form the structure forming the subsequent upper side of the cup edge. The material displaced by the perforating element 5 flows into the grooves 56 which are only outlined in FIG. 1 and clearly recognizable in the enlargement of FIG. 7 and formed laterally of the perforating element 5 in the counter support 11. Due to this, the thickness of the material of the plastic sheet between the blank holder 3 and counter support 11 in the subsequent connecting web area 46 of the cup element 38 to be produced is not changed in such a way that a premature placing of the blank holder 3 with a resultant increased pressing of the surface will take place.

After the placing of the blank holder 3 a feed of the cogging punches 6 *a,b* in the direction of the lower die takes place. The cogging punches 6 *a,b* draw the material of the sheet present in the gap 45 into the hollow space formed by the molding sleeve 9 a,b, and the ejector 10 *a*,b. Due to the generation of a molding pressure in the area between the material and the inner space 43 between the blank holder 3 and the cogging punches 6 *a,b* plastic material rests against the molding contour. Due to a further feed of the carrier 2 of the upper die in the direction of the lower die an interaction between the cutting die 7 and the blank holder 3. The inner contour of the cutting die 7 corresponds to the outer contour of the blanking punch 8. Due to the feed, the cutting die 7 with this inner contour pushes across the outer contour of the blanking punch 8, due to which a stamping out of the material forming the cup element 38 takes place. After a suitable cooling—the lower die may be designed in a cooled fashion—the entire upper die is lifted off from the lower die. Due to a feed of the ejectors 10 *a,b* in the direction of the completely lifted upper die, the now fully molded cup element 38 is ejected from the lower die and removed from the thermoforming die. The entire cycle described above is repeated for the production of a further cup element 38.

Figure 2:
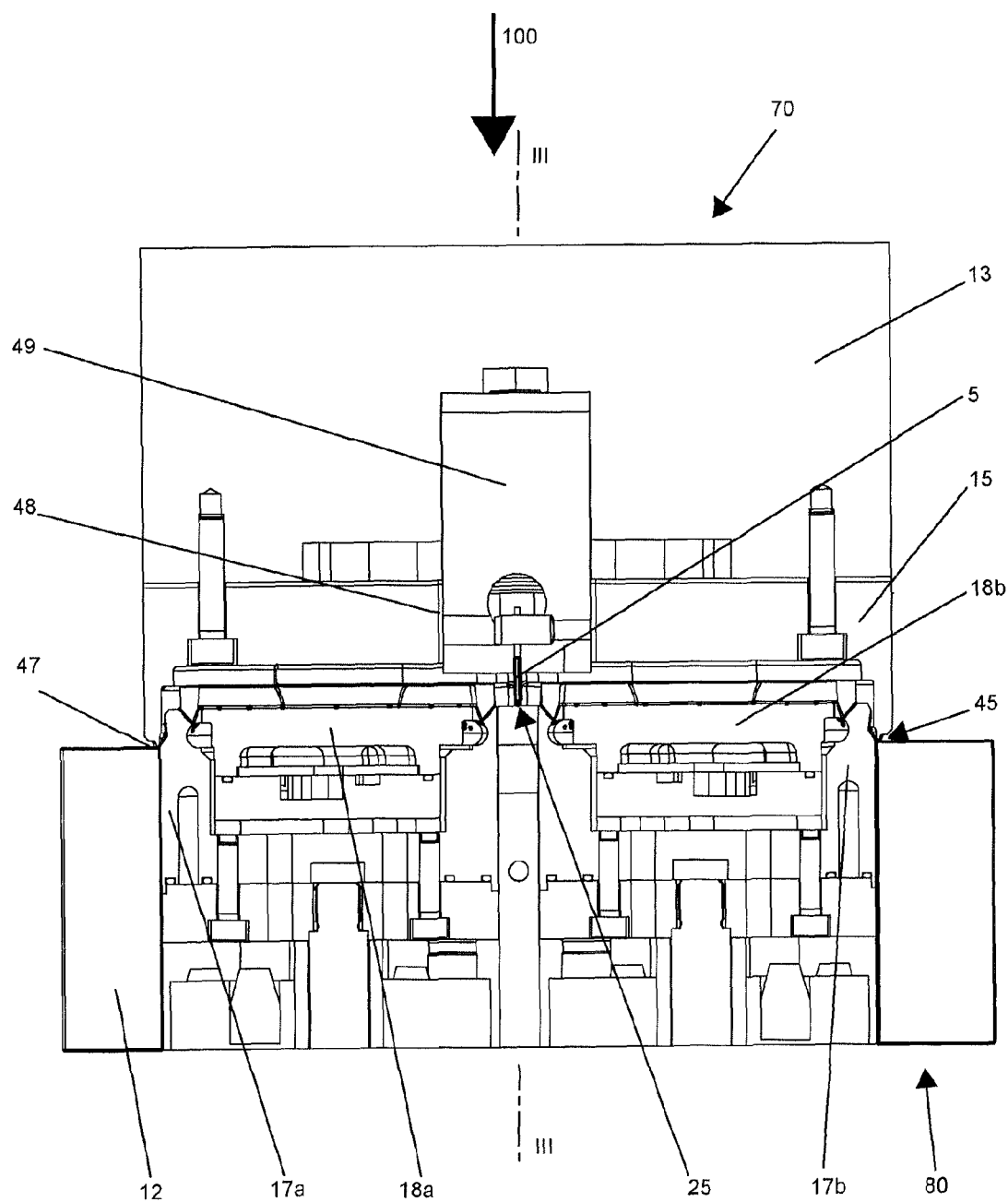
FIG. 2: shows a sectional representation of a thermoforming die with integrated perforating device for a lid element.
Figure 3:
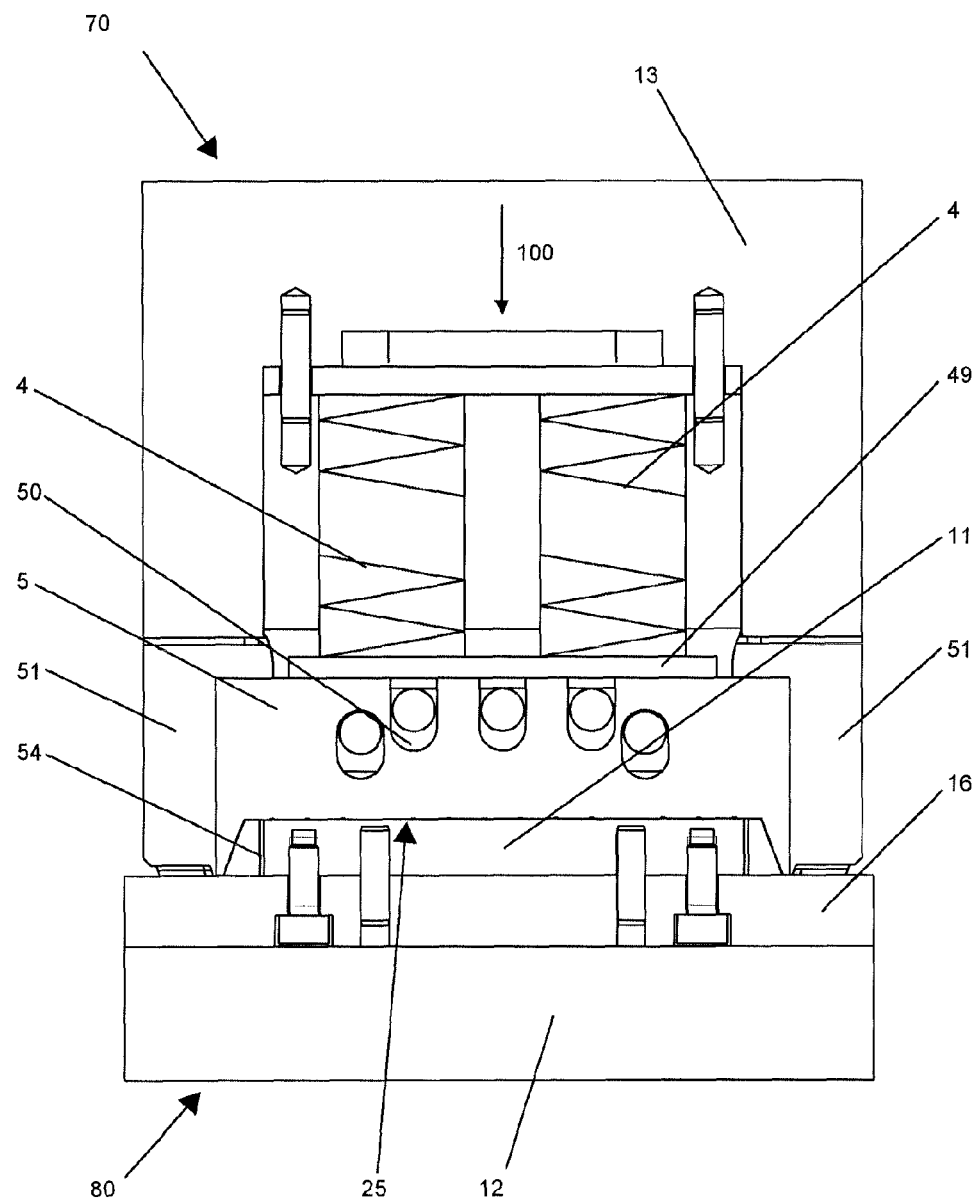
FIG. 3: shows a sectional representation of the thermoforming die of FIG. 2 along the line III/III.

The thermoforming die represented in FIGS. 2 and 3 for producing a lid element 39 for the cup element produced by means of the device according to FIGS. 1 and 8 functions in a similar fashion. The upper die has an upper die carrier 13. A cutting knife 15 is disposed on the same. The cutting knife 15 has a circumferential cutting edge 47. The side of the cutting knife 15, which points in the direction of the lower die, is designed in a contoured fashion in the area located within the circumferential cutting edge 47 in accordance with the upper side of the lid element 39 to be produced.

The cutting knife 15 has a recess 48, within which the perforating element 5 is disposed in a holder 49. The holder 49 and the perforating element 5 are disposed in the upper die carrier 13 by means of two spring assemblies 4 in a biased fashion in such a way that a relative displacement can take place in the longitudinal direction of the oblong holes 50 which can be recognized in FIG. 3. Two lateral perforating elements 51 are disposed at the side of the perforating element 5 in FIG. 3. These are fixed relative to the upper die carrier 13 so that the perforating element 5 can also be displaced relative to the lateral perforating elements 51 in the direction described above.

A counter support 11 is disposed in the area between the two molding rings 17 in the lower die opposite to the perforating element 5. It cooperates with the perforating element 5 and, if necessary, lateral perforating elements 51 upon the introduction of the mechanical weakening in the lid element 39.

A clamping frame (not shown) is also disposed on the upper die carrier 13, which fixes the sheet-shaped starting material in the thermoforming die by means of a counterpunching plate (also not shown). In addition to this function as a clamping tool, the counterpunching plate has the further function of acting as a counterelement to the circumferential cutting edge 47 of the cutting knife 15 in order to make a punching out of the lid element 39 formed between the upper die and the lower die from the sheet web material possible. The counterpunching plate is disposed on the lower die carrier 12.

Two molding rings 17 are so to speak disposed on the carrier 1 of the lower die which mold parts of the subsequent inner contour of the lid element 39 to be produced. They have in each case a recess within which a mold bottom 18 *a,b* is disposed. The mold bottoms 18 *a,b* have the function of molding parts of the inner area of the lid element 39 and, after the implemented molding, of ejecting the produced lid element 39 from the lower die—similar to the ejectors 10 *a,b* in the thermoforming die explained above in connection with FIG. 1.

The production of the lid element 39 is implemented in a similar fashion as that of the cup element 38. At first, a sheet-shaped starting material is heated to a suitable processing temperature in a heating area connected in series with the thermoforming die and pulled into the gap 45 present between the lower die and the upper die with the thermoforming die being open. During a subsequent closing movement of the upper die in the direction of the lower die the perforating element 5 leading the clamping frame and the cutting knife 15 is first of all put on the sheet material. The mechanical weakening is introduced into the material. Subsequently, the clamping frame slightly leading the cutting knife 15 touches down and, together with the counterpunching plate, fixes the sheet material. Due to a further feed the cutting knife 15 gets into its desired final position relative to the lower die. The further shaping of the plastic material is implemented by generating a molding pressure in the area between the upper die and the sheet material and/or by generating a subpressure in the area between the lower die and the sheet material. The lid element 39 is punched out by means of the circumferential cutting edge 47 at the counterpunching plate. After a suitable cooling time—the thermoforming die may also be designed in a cooled fashion—lower die and upper die are opened, whereupon the produced lid element 39 is ejected from the lower die by means of a feed of the mold bottoms 18 and removed from the thermoforming die. The process described above is repeated for the production of further lid elements 39.

As can be gathered from FIG. 3 the elastomer elements 54 are introduced into the counter support 11. The elastomer elements 54 serve for compensating for e.g. alignment errors, dimensional imperfections or heat- or load-induced deformations between the counter support 11 and the perforating element 5 and possibly present lateral perforating elements 51 and their wear due to an elastic deformation.

Figure 4:
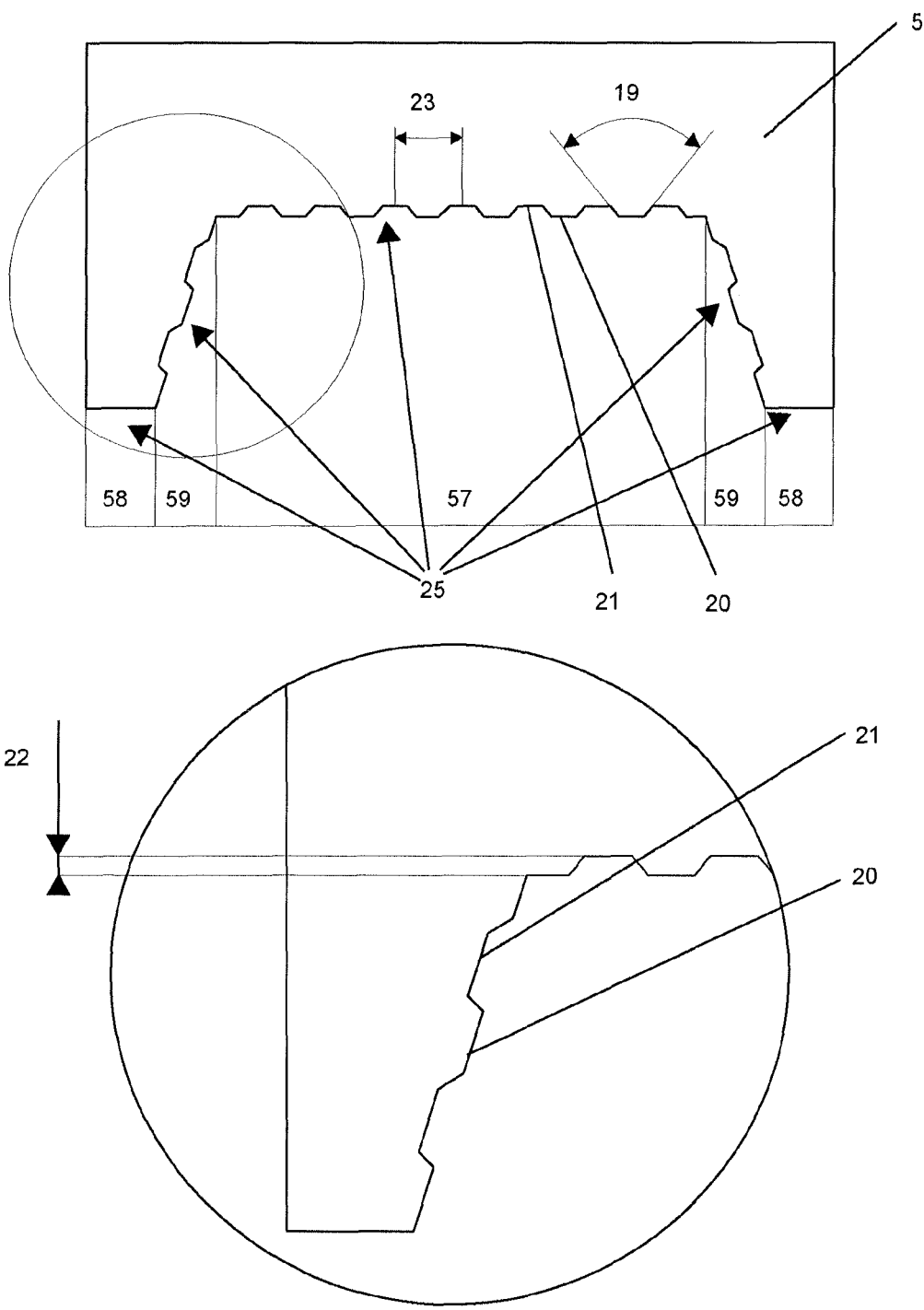
FIG. 4: shows a schematic representation and an enlargement of a perforating element that can be used in the thermoforming die of FIGS. 2 and 3.

Whereas the mechanical weakening is introduced into the lid element 39 by means of the perforating element 5 and the lateral perforating elements 51 in FIG. 3, this can also be exclusively implemented with the one-part perforating element 5 which is schematically represented in FIG. 4. It has a cutting edge which is designed in a "toothed" fashion, which is also designated as perforating or stamping cutting edge. This cutting edge consists of teeth 20 which determinate the perforating width, recesses 21 present between the teeth 20, which determine the web width of the perforation, the recesses 21 receding by the stamping depth 22 with respect to the teeth 20. Further parameters determining the perforation to be produced are the pitch 23, the width of the perforating or stamping cutting edge 25 and the blade angle 26. The element represented in FIG. 4 has a cutting edge which is altogether substantially designed in a bridge-shaped fashion with two segments 59 disposed at the side of the central cutting edge section 57 and adjoining sections 58 for forming perforation areas outside the plane of the lid panel and/or the section 57.

Figure 6:
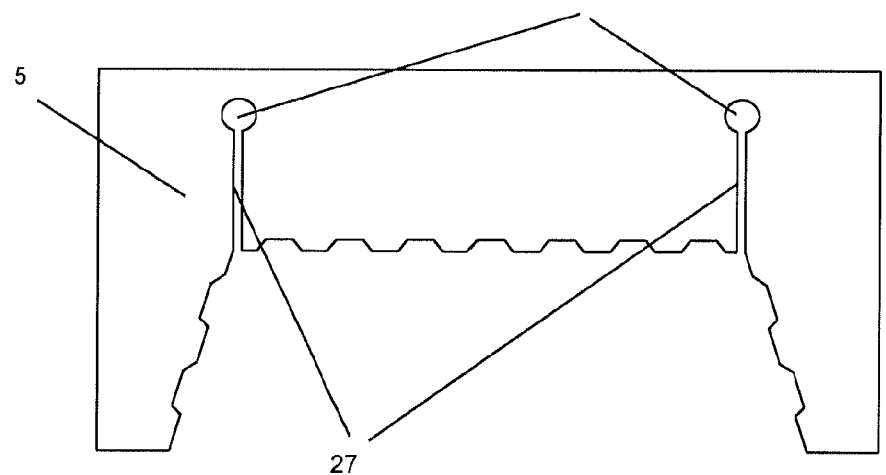
FIG. 6: shows various embodiments of a perforating element.
Figure 6:
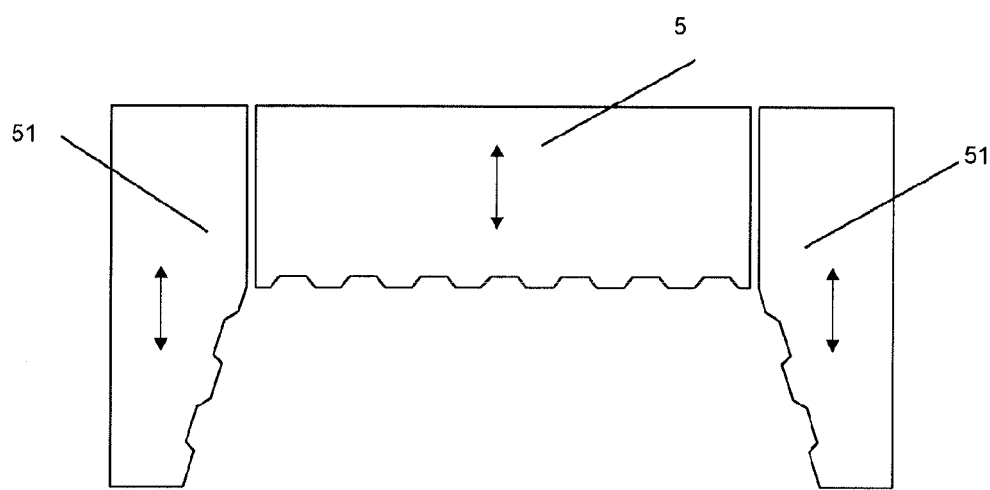
Figure 6:
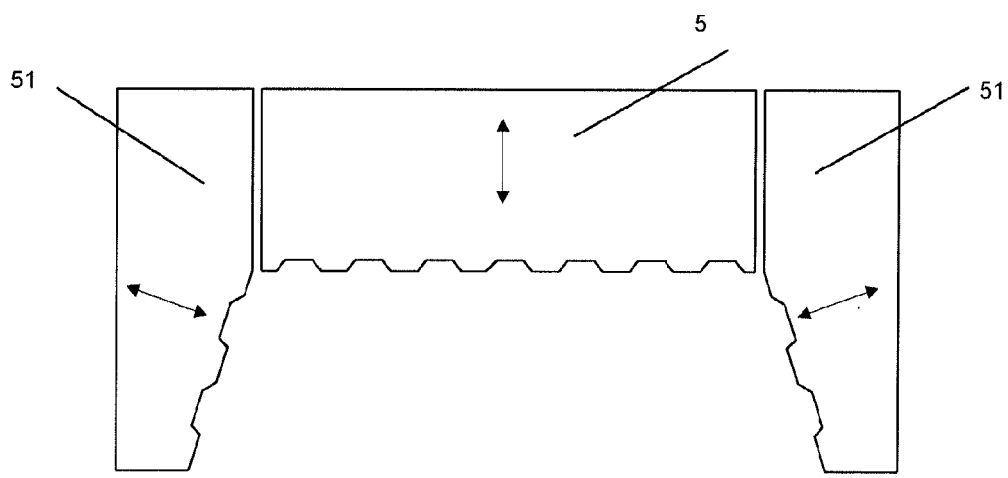

FIG. 6 shows two modified embodiments of the perforating element 5 represented in FIG. 4. In these modification resilient springs 27 are introduced into the perforating element 5 as in the counter support 11 described above, which serve for compensating for alignment errors, deviations, etc. between the counter support 11 and the perforating element 5. The resilient springs 27 have a relief curve 28 in their end area, which is substantially designed in a circular segment shaped fashion and serves for minimizing the notch effect introduced into the counter support 11 by the resilient springs 27. The feed possibilities of a perforating element which is similar to the perforating element 5 represented in FIGS. 2 and 3 are also made clear in the middle and at the bottom of FIG. 6. The feed of the perforating element 5 takes place independently of the feed of the lateral perforating elements 51 in the upper righthand illustration, but in both cases in the direction of the lower die. The feed of perforating element 5 and lateral perforating elements 51 takes place in the righthand bottom illustration independently both in terms of time and direction.

Figure 5:
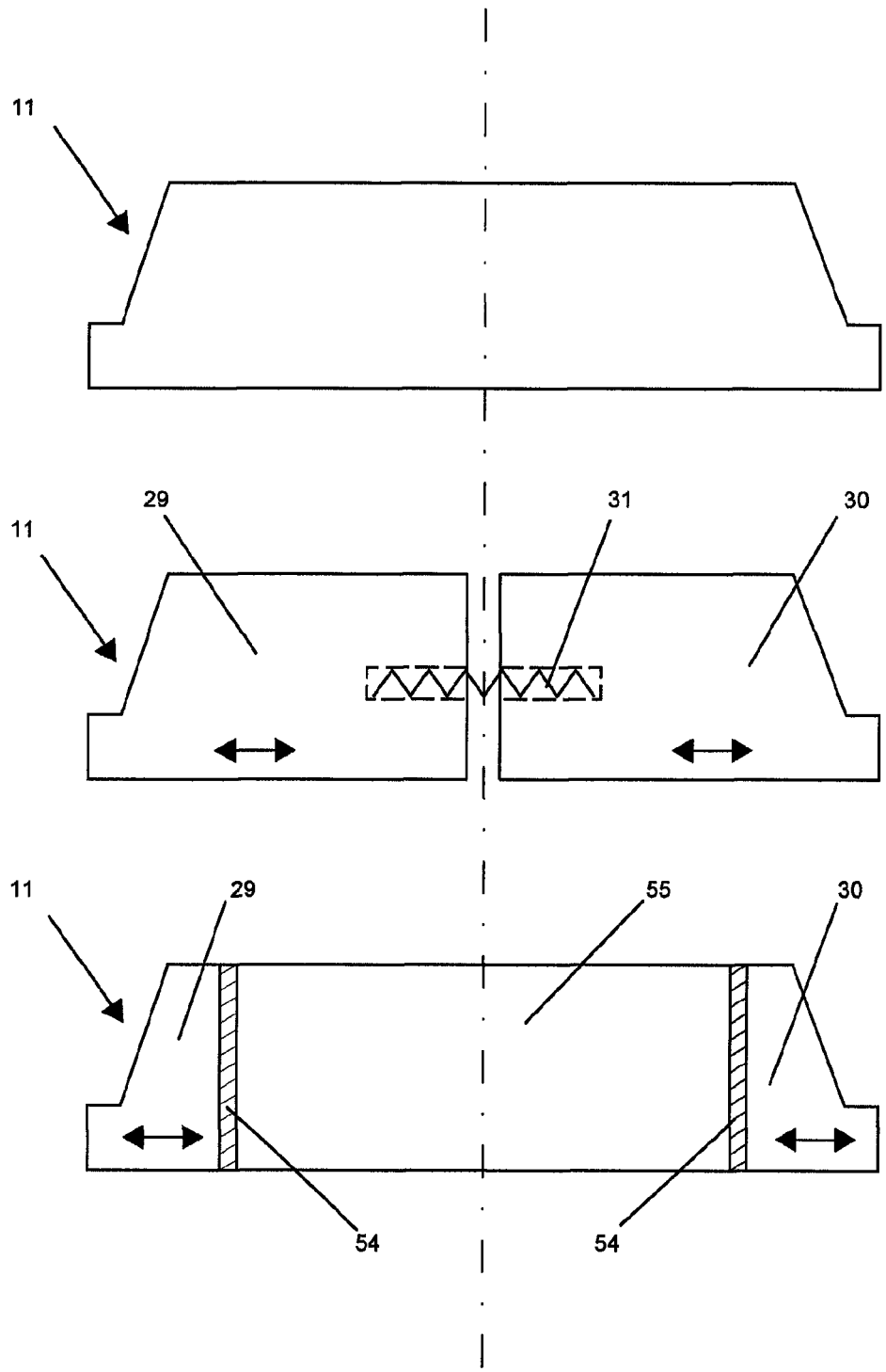
FIG. 5: shows a schematic representation and variations of a counter support for the perforating element according to FIG. 4.

A few possibilities are represented in FIG. 5 as to how the counter support 11 can be designed in accordance with the perforating element used for a use in the present invention in a fixed or flexible fashion, i.e. with corresponding compensating elements for alignment errors, deviations, etc.

In the first alternative the counter support 11 is designed as a solid block. This counter support 11 is customarily used with a perforating element 5 according to FIG. 6. In another embodiment the counter support is designed in two parts, both segments 29, 30 being biased by means of a compensating spring 31. Both elements of the counter support 11 are displaceably accommodated in the lower die so that they can carry out the compensating movement outlined in FIG. 5 due to this displaceable accommodation and the bias by means of the balancing spring 31. Similar or identical compensating movements can be achieved by the use of an elastomer element 54. In the represented case two elastomer elements 54 are used which subdivide the counter support 11 into a central portion 55 and two outer segments 29, 30. A further possibility is the introduction of resilient springs, preferably with relief curves 28.

The process according to the invention and the die according to the invention were described above by way of example with reference to the production of a food packaging with a cup element 38 and a matching lid element 39. The mechanical weakening in the form of a stamping 33 or a perforation 34, which is introduced into the lid element 39 and the cup element 38 in the connecting web area, serves for the fact that the user can individually separate the individual parts of the food packaging designed as a container with two or several units in each case from the remainder of the food package and can consume them (cf. FIGS. 9 and 10). However, in addition to this, further application possibilities (not shown) are given for the present invention. Thus, it is possible to e.g. produce lid elements in which a lid has a mechanical weakening consisting of a perforation and a stamping, which is disposed in a corner area of the lid. Due to the mechanical weakening introduced into the lid it is possible for a user to tear it open along the perforation. The mechanical weakening consisting of stamping and perforation subdivides the lid into two functional areas, namely, on the one hand, a reclosable lid element and the remaining part of the lid. Due to the edge-side shaping of the lid and the possibly provided use of snaps the lid element is reclosable. An application for such a lid is e.g. packagings for deep-freeze herbs or similar goods for forming a pour opening.

In another lid an opening for a drinking straw may be formed in the area of the lid panel. It is determined by a mechanical weakening which also consists of a stamping and a perforation and can be opened by a user. Such lid elements are e.g. suitable for containers for hot beverages and cold beverages in the fast food sector.

The invention claimed is:

1. A die for producing thermoformed articles such as food packaging or parts thereof, by thermoforming a plastic sheet and providing a mechanical weakening in the plastic sheet material between adjoining functional areas of the thermoformed article, which functional areas are separable at least partly from each other at the mechanical weakening when utilized by a user, the die comprising:
   an upper die,
   a lower die and
   at least one perforating or stamping element with a perforating or stamping cutting edge, which is disposed in the upper die or the lower die, the upper die and the lower die being movable against each other, wherein the perforating or stamping cutting edge comprises:

at least two first sections which are staggered relative to each other in the direction of movement of the die and extend vertically to it and each of the two first sections forms a section of the mechanical weakening, and at least one second section that is formed at an angle α other than 90° to the direction of movement of the die and forms a section of the mechanical weakening.

2. The die according to claim 1, characterized in that at least one perforating or stamping element approaches the upper die and/or the lower die in the direction of movement of the die.

3. The die according to claim 1, characterized in that at least one perforating or stamping element is biased with respect to the upper die and/or the lower die.

4. The die according to claim 1, characterized in that it has recesses on the side of the upper die and/or the lower die pointing towards the plastic sheet, preferably in the form of relief grooves, for receiving the plastic sheet material displaced by the perforation or stamping.

5. The die according to claim 1, characterized in that it has a counter support for the perforating or stamping element.

6. The die according to claim 1, characterized in that at least one perforating or stamping element has a first compensating structure enabling an elastic deformation of the perforating or stamping element.

7. The die according to claim 5, characterized in that the counter support has a second compensating structure enabling an elastic deformation.

8. The die according to claim 1, characterized in that several perforating or stamping elements are provided and can be positioned independently of each other.

9. A die for producing thermoformed articles such as food packaging or parts thereof, by thermoforming a plastic sheet and providing a mechanical weakening in the plastic sheet material between adjoining functional areas of the thermoformed article, which functional areas are separable at least partly from each other at the mechanical weakening when utilized by a user, the die comprising:

an upper die, a lower die and at least one perforating or stamping element with a perforating or stamping cutting edge, which is disposed in the upper die or the lower die, the upper die and the lower die being movable against each other, wherein the perforating or stamping cutting edge comprises:

at least two first sections which are staggered relative to each other in the direction of movement of the die and extend vertically to it and each of the two first sections forms a section of the mechanical weakening and comprises alternating raised teeth and lowered recesses, and at least one second section that is formed at an angle α other than 90° to the direction of movement of the die and forms a section of the mechanical weakening and comprises alternating raised teeth and lowered recesses.

* * * * *